May 12, 1942. W. L. SMITH 2,282,535
PORTABLE PRESS DRILL
Filed Sept. 16, 1940 2 Sheets-Sheet 2

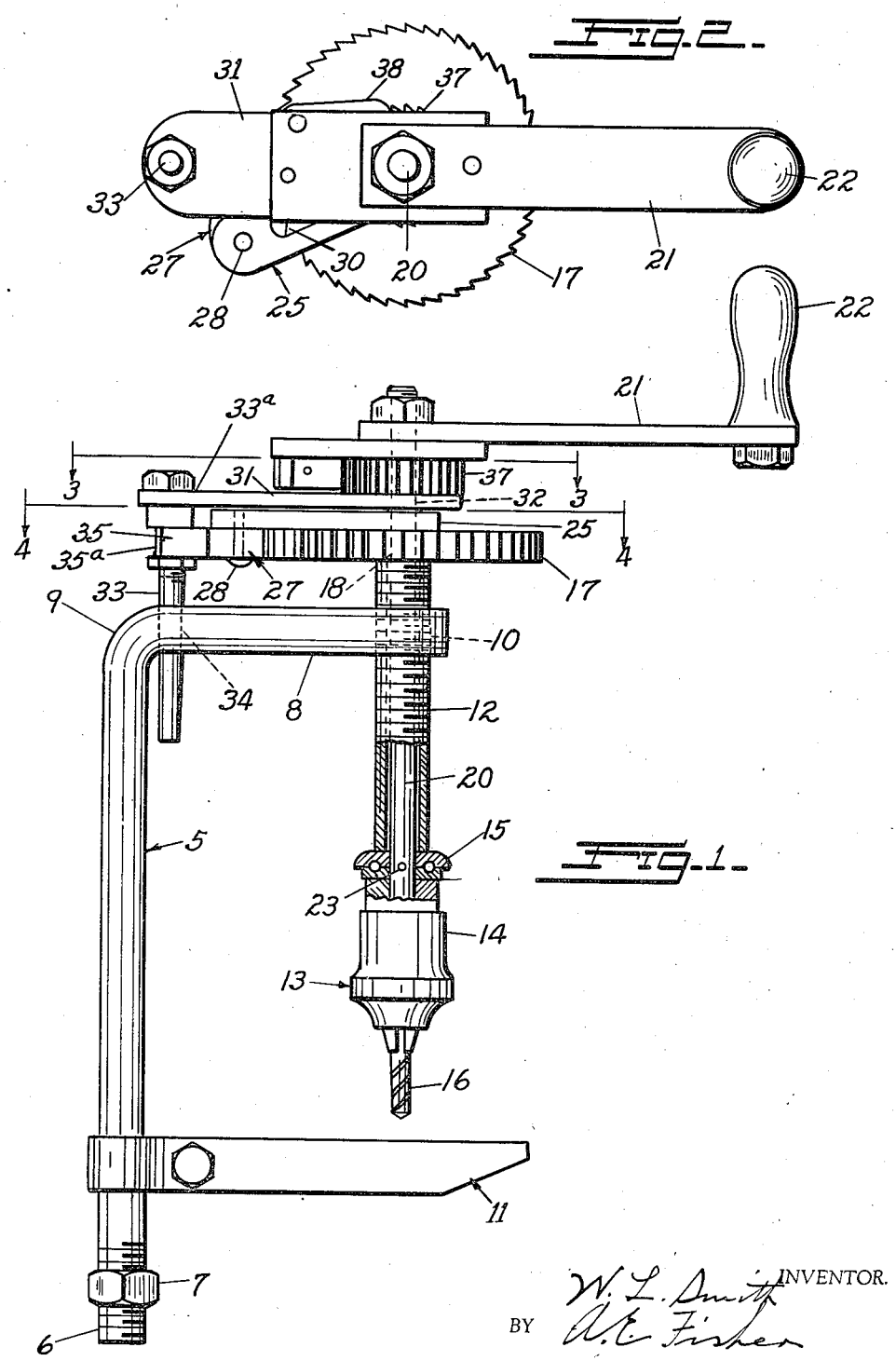

INVENTOR.
BY
ATTORNEY.

Patented May 12, 1942

2,282,535

UNITED STATES PATENT OFFICE 2,282,535

PORTABLE PRESS DRILL

Walter L. Smith, Likely, Calif.

Application September 16, 1940, Serial No. 356,923

1 Claim. (Cl. 77—32)

This invention relates to portable press drills, and the principal object is to provide in a simple and efficient form, a portable press drill with automatic feed devices for pressing the drill to the work.

Another object is to provide a tool of the kind referred to, including a vertical standard attachable to a work bench and having a work rest or support slidably mounted thereon, the upper end of the standard being turned horizontally over the work rest, and carrying a tubular and threaded feed shaft rotatably passed through its tapped extremity, in operative alignment with the work rest, carrying at its lower end a drill chuck unit journaled thereon, and at its upper end a rigidly connected ratchet gear, a crank operated work shaft extended freely through the feed shaft and anchored to the drill chuck unit, and means for moving the ratchet gear slightly on each complete rotation of the work shaft, for lowering same slightly towards the work rest.

A preferred embodiment of the invention is shown in the accompanying drawings, wherein:

Figure 1 is a side elevation of the tool.

Figure 2 is a top plan view.

Figure 3:
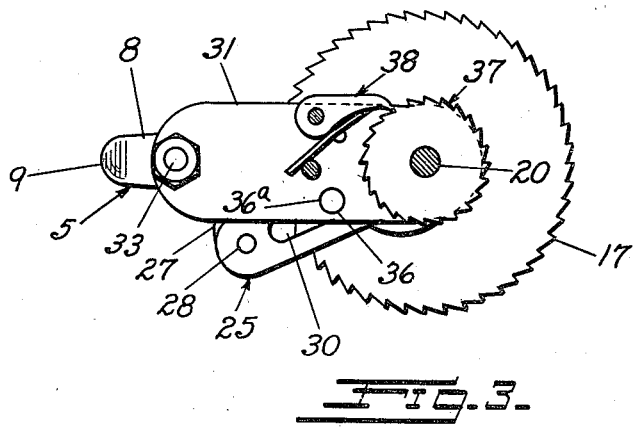
Figure 3 is a cross section on the line 3—3 of Figure 1.
Figure 4:
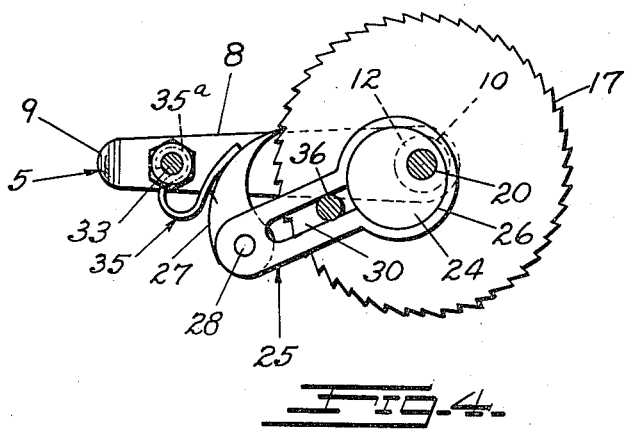
Figure 4 is a cross section on the line 4—4 of Figure 1.

The invention comprises a conventional standard 5 threaded at its lower end 6 and provided with a nut 7 for attachment to a work-bench (not shown). The upper end 8 of the standard is turned laterally at a right angle 9 and 10 the extremity thereof is tapped as shown at 10. Any suitable form of work rest 11 is adjustably mounted on the standard 5.

Through the tapped end 10 of the standard, there is rotatably extended a tubular, threaded feed shaft 12. A drill chuck unit 13 including a tubular shank 14 is rotatably mounted on the lower end of the feed shaft, as shown at 15. The drill chuck unit is of course adapted to releasably hold a drill 16, and is of conventional structure.

A ratchet gear 17, centrally apertured as at 18, is rigidly anchored to the upper end of the shaft 12, with the aperture 18 aligned with the bore of the shaft. A smaller work shaft 20 is freely passed into the feed shaft 12 and carries a crank arm 21 at its upper end, the crank having a handle 22. The lower end of the shaft 20, within the shaft 12, is passed into the tubular shank 14 of the drill chuck unit, and there permanently pinned, as indicated at 23, the pin being passed through the walls of the shank and through the shaft 20. Thus the drill chuck unit may be rotated through operation of the crank 21, and may be lowered towards the work rest by clockwise rotation of the shaft 12.

A circular cam 24 is rigidly and eccentrically anchored to the shaft 20, above the gear 17, and a pawl carrying arm 25, formed at its inner end with a circular cut-out 26 for engaging the cam 24, is thereby engaged with said cam. A pawl 27 is pivotally bolted as shown at 28 to the outer free end of the arm 25, the working end of this pawl being placed in operative juxtaposition with the ratchet gear 17, and so as to turn same clock-wise with the pawl. The arm 25 is also slotted longitudinally and medially, as shown at 30, for a purpose to be later explained.

An anchor arm or plate 31 is journaled at its inner end as indicated at 32 upon the shaft 20, and an anchor pin 33 has its head rigidly set at 33a in the outer end of the arm 31, while the pin itself is slidably passed through an aperture 34 pierced through the horizontal end 8 of the standard 5. A looped leaf spring 35, anchored at its outer end 35a to the pin 32, has its free end disposed inwardly contiguous and in the plane of movement of the pawl 27, so as to limit the outward movement of the said pawl and press same inward upon the gear 17. A guide pin 36 is seated at its upper end 36a medially in the margin of the arm 31 first met by the clockwise rotated crank 21, the lower end of said pin depending freely within the slot 30 of the pawl carrying arm 25.

In lieu of the rigid connection of the crank arm 21 upon the work shaft 20, the arm 21 might be journaled to the shaft 20, and a conventional ratchet and pawl unit 37—38, interposed between the crank and shaft, the ratchet 37 being permanently anchored to the shaft.

In the use of this tool, in the assembly as shown, the elements are so designed and assembled, and the cam 24 so positioned with reference to the anchor arm 31, that as the crank arm 21 is rotated clockwise for turning the drill 16, the pawl carrying arm 25 is reciprocated radially over the guide-pin 36, and this pin being held stationary by the arm 31, the resulting oscillating action is, that as said crank arm 21 moves across and away from the arm 31 to first retract the toe of the pawl 27 over the gear 17, and then as the crank arm approaches the arm 31 in completing its circuit, to turn or dip the toe of the pawl inwardly against said rack gear, and to slightly move the gear 17 in unison with the pawl. Since the gear 17 is anchored to the tubular feed shaft 12, this shaft is moved slightly downward through the end 8 of the standard 5, and the drill 16 is correspondingly urged into the work on the rest 11. Thus the drill is simultaneously rotated and urged against the work. The movement of the pin 33 through the standard end 8, is of course coincident with the movement of the shaft 12.

It is thought that the construction, use and operation of the tool will be fully understood from the foregoing description. The embodiment of the tool as here shown may of course be changed or modified, within the scope of the claim.

I claim:

In a tool of the kind described, a vertical standard having a horizontally extended upper end, the extremity thereof being tapped vertically, an exteriorly threaded tubular feed shaft passed vertically through the tapped extremity of the standard and in threaded engagement therewith, a drill chuck journaled at the lower end of the feed shaft, a centrally apertured ratchet gear anchored concentrically on the upper end of the feed shaft, a work-shaft passed freely through the tubular feed shaft and locked at its lower end to the drill chuck, a circular cam rigidly and eccentrically mounted on the upper end of the work-shaft, a medially and longitudinally slotted pawl carrying arm having a circular cut-out at its inner end and thereby journaled upon said cam of the work-shaft above the said ratchet gear of the feed shaft, a pawl pivoted through its heel to the outer end of the pawl carrying arm, the toe of the pawl being adapted to traverse the periphery of the ratchet gear, an anchor arm journaled at its inner end to the work shaft above the pawl carrying arm, an anchor pin depended from the outer end of the anchor arm into slidable engagement with the horizontal end of the standard, a guide pin seated medially in the anchor arm and extended freely into the slot of the pawl carrying arm, and means for resiliently urging the said pawl against the said ratchet gear.

WALTER L. SMITH.